US012210121B1

(12) United States Patent
Lin et al.

(10) Patent No.: US 12,210,121 B1
(45) Date of Patent: Jan. 28, 2025

(54) AUTONOMOUS VEHICLE INCLUDING LIDAR SENSOR SYSTEM HAVING IMPROVED PHOTONICS INTERFACE

(71) Applicant: Aurora Operations, Inc., Pittsburgh, PA (US)

(72) Inventors: Sen Lin, Mountain View, CA (US); Lei Wang, Fremont, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

(21) Appl. No.: 18/641,011

(22) Filed: Apr. 19, 2024

(51) Int. Cl.
*G01C 3/08* (2006.01)
*G01S 7/481* (2006.01)
*G01S 17/931* (2020.01)

(52) U.S. Cl.
CPC .......... *G01S 7/4814* (2013.01); *G01S 7/4816* (2013.01); *G01S 17/931* (2020.01)

(58) Field of Classification Search
CPC ..... G01S 7/4814; G01S 7/4816; G01S 17/931
See application file for complete search history.

(56) References Cited

U.S. PATENT DOCUMENTS

| 2018/0188355 | A1* | 7/2018 | Bao | G01S 17/42 |
| 2021/0382142 | A1* | 12/2021 | Rogers | G01S 7/4861 |
| 2022/0187471 | A1* | 6/2022 | Eshel | G01S 17/89 |

FOREIGN PATENT DOCUMENTS

| CN | 209514069 U | * 10/2019 | G01S 17/89 |
| WO | WO-2016051836 A1 | * 4/2016 | G02B 5/04 |

* cited by examiner

*Primary Examiner* — Mark Hellner
(74) *Attorney, Agent, or Firm* — Dority & Manning, P.A.

(57) ABSTRACT

A light detection and ranging (LIDAR) system for a vehicle can include: a light source configured to output a transmit beam at a first orientation; a reflective surface configured to redirect the transmit beam from the first orientation to a second orientation; and a lens interface configured to receive the transmit beam at the first orientation and focus the transmit beam onto the reflective surface; wherein the LIDAR system emits the transmit beam at the second orientation into an environment of the LIDAR system.

20 Claims, 9 Drawing Sheets

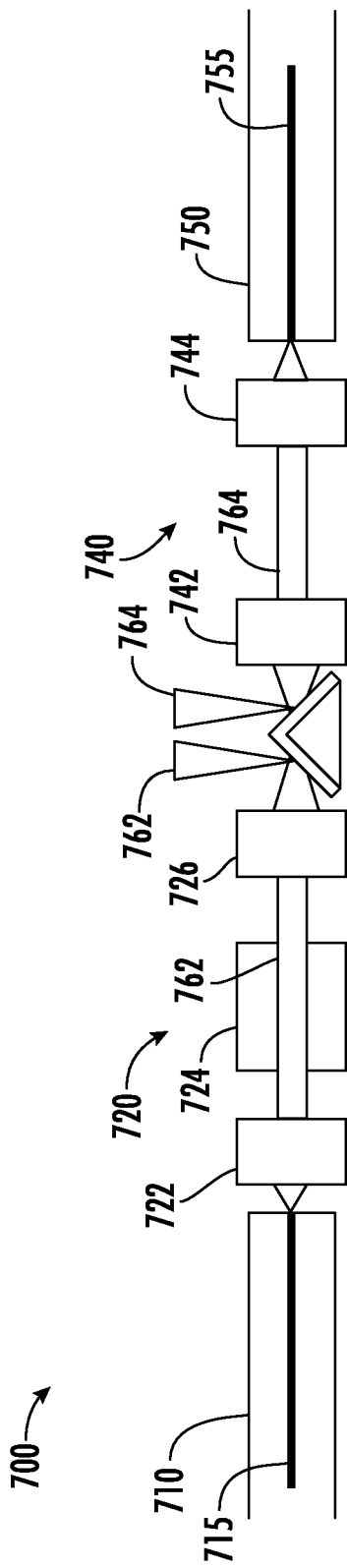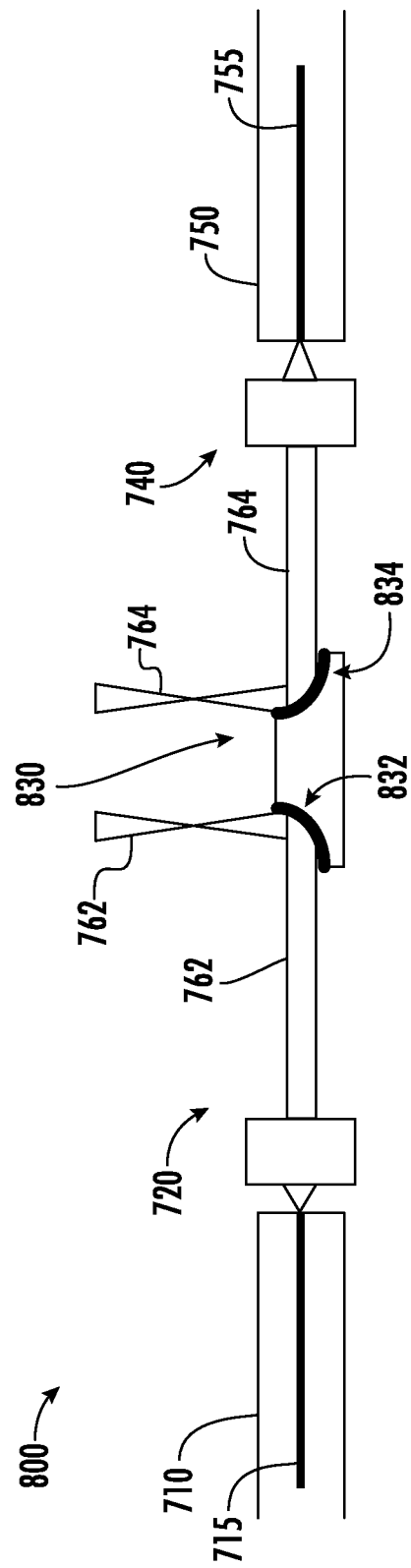

AUTONOMOUS VEHICLE INCLUDING LIDAR SENSOR SYSTEM HAVING IMPROVED PHOTONICS INTERFACE

BACKGROUND

Light Detection and Ranging (LIDAR) systems use lasers to create three-dimensional representations of surrounding environments. A LIDAR system includes at least one emitter paired with a receiver to form a channel, though an array of channels may be used to expand the field of view of the LIDAR system. During operation, each channel emits a laser beam into the environment. The laser beam reflects off of an object within the surrounding environment, and the reflected laser beam is detected by the receiver. A single channel provides a single point of ranging information. Collectively, channels are combined to create a point cloud that corresponds to a three-dimensional representation of the surrounding environment.

SUMMARY

Aspects and advantages of implementations of the present disclosure will be set forth in part in the following description, or may be learned from the description, or may be learned through practice of the implementations.

Example aspects of the present disclosure are directed to LIDAR systems for autonomous vehicles. As further described herein, the LIDAR systems can be used by various devices and platforms (e.g., robotic platforms, etc.) to improve the ability of the devices and platforms to perceive their environment and perform functions in response thereto (e.g., autonomously navigating through the environment).

An autonomous vehicle (AV) can include a LIDAR system to assist the AV in perceiving its environment and navigating its environment. The LIDAR system can include a transceiver having a transmitter and receiver. The transmitter can condition a light beam (e.g., a laser beam) to be emitted by the LIDAR system into its environment. Similarly, the receiver can provide for receiving the light beam after it is emitted into the environment of the LIDAR system and reflected by objects in the environment. The receiver can provide the received beam to downstream components of the LIDAR system for processing, which can provide for the AV to perceive its environment. Because of the correlation between the transmitted beam and received beam, the transmitter and receiver may generally be placed in a tightly controlled positional relationship. For instance, the portion of the transmitter that emits the beam can be positioned near the portion of the receiver that receives the beam. In addition, some LIDAR systems such as coherent LIDAR systems can utilize a reference signal, such as a local oscillator (LO) signal, that passes from the transmitter to receiver without being emitted into the environment of the LIDAR system. For instance, this reference signal may be combined with the received beam to denoise or otherwise process the received beam to extract useful information. For instance, the LIDAR system can determine a distance to the object and/or velocity of the object based on the reflected beam.

However, the transmitter and/or receiver often include photonic circuitry that occupies space near the transmitting and receiving portions. Controlling the positioning of the transmitter and receiver can therefore include accounting for the photonics dies. The photonics dies including the photonic circuitry may be formed of silicon. Silicon photonics dies can provide for precise formation of the photonic circuitry through, for example, photolithography. However, silicon may be unable to or may provide reduced performance at generating light, so these photonics dies are often connected to a separate light source and/or amplifier (e.g., a semiconductor optical amplifier (SOA)) formed of a non-silicon material, such as, for example, a group III-V semiconductor, gallium arsenide (GaAs), and/or other suitable materials. The light can be fed from the light source to the silicon photonics dies. In some existing LIDAR systems, the light may be interfaced from a first die including, for example, the light source and/or amplifiers to a second die including the transmitter through one or more waveguides. Coupling the light into these waveguides often incurs significant loss, especially as the size of the waveguides decreases. In some cases, losses as great as 60% may be experienced due to the coupling between a semiconductor optical amplifier and transmit die.

The present disclosure provides an improved LIDAR system, such as a coherent LIDAR system, that does not suffer from these drawbacks. In particular, the present disclosure provides a LIDAR system where the beam generated by the light source does not necessarily enter a silicon photonics chip for transmission. Rather, according to example aspects of the present disclosure, a light steering device, such as a lens interface, directs light from the light source (e.g., after modulation and/or amplification) onto a reflective surface. For instance, in some implementations, the lens interface may be a lens array configured to collimate and/or focus any divergent light from the light source. The reflective surface redirects the light into the environment of the LIDAR system. As one example, the reflective surface may be or may include a reflective coating (e.g., a metal coating) on a substrate.

Furthermore, in some implementations, a receiver photonics die can be positioned such that the light reflected by the reflective surface passes through the receiver photonics die prior to being emitted into the environment of the LIDAR system. For instance, the receiver photonics die may include a material that is transparent to the beam, such as, for example, silicon. Furthermore, the receiver photonics die may include a receive portion that can receive the returned beam (e.g., by not being transparent to the returned beam). In this manner, the positioning of the receiver photonics die may be tightly controlled relative to the transmitted beam, satisfying positioning constraints associated with coherent LIDAR systems, while further avoiding losses associated with conventional waveguide-based manipulation of the transmit beam.

A LIDAR system according to the present disclosure can provide numerous technical effects and benefits. For instance, the LIDAR systems according to the present disclosure can provide improved accuracy of object detections through stronger emitted beams attributable to reduced loss associated with waveguides. Additionally, the LIDAR systems can provide for reduced power consumption in generating emitted beams having comparable intensities due to the reduced loss. In this manner, LIDAR systems according to the present disclosure can provide improved performance compared to some existing LIDAR systems.

For example, in an aspect, the present disclosure provides a light detection and ranging (LIDAR) system for a vehicle. The LIDAR system includes a light source configured to output a transmit beam at a first orientation. The LIDAR system includes a reflective surface configured to redirect the transmit beam from the first orientation to a second orientation. The LIDAR system includes a lens interface configured to receive the transmit beam at the first orientation and focus the transmit beam onto the reflective surface. The LIDAR system emits the transmit beam at the second orientation into an environment of the LIDAR system.

In some implementations, the LIDAR system includes a modulator configured to receive the transmit beam from the light source and modify at least one of phase or frequency of the transmit beam.

In some implementations, the reflective surface comprises a flat surface.

In some implementations, the reflective surface comprises a concave surface.

In some implementations, the LIDAR system includes an amplifier configured to receive the transmit beam from the light source and amplify the transmit beam.

In some implementations, the LIDAR system includes a splitter configured to split the transmit beam among a plurality of channels.

In some implementations, the lens interface is or includes a lens array, the lens array having a plurality of lenses respective to a plurality of channels.

In some implementations, the lens interface includes at least a first lens configured to collimate the transmit beam to produce a collimated beam and a second lens configured to focus the collimated beam at a focal point on the reflective surface.

In some implementations, the LIDAR system includes a half-wave plate (HWP) configured to shift a polarization direction of the transmit beam.

In some implementations, the LIDAR system includes a receiver photonics die, the receiver photonics die configured to receive a received beam from the environment of the LIDAR system.

In some implementations, the receiver photonics die is substantially transparent to the transmit beam, and the receiver photonics die is disposed above the reflective surface such that the transmit beam passes through the receiver photonics die after being reflected by the reflective surface.

In some implementations, the receiver photonics die includes a transmit portion through which the transmit beam passes and a receiving portion offset from the transmit portion, the receiving portion configured to receive the received beam from the environment of the LIDAR system and provide the received beam to at least one photonics component on the receiver photonics die.

In some implementations, the reflective surface is disposed on a substrate, and the substrate and the receiver photonics die each include one or more alignment guides indicating an alignment between the substrate and the receiver photonics die.

In some implementations, the receiver photonics die is substantially coplanar with a transmit die, the transmit die configured to provide the transmit beam from the light source to the lens interface. In some implementations, the LIDAR system further includes: a second reflective surface configured to receive the received beam at the second orientation and redirect the received beam from the second orientation to the first orientation; and a second lens interface configured to focus the received beam into the receiver photonics die.

In some implementations, the receiver photonics die is or includes silicon.

In some implementations, the reflective surface is or includes a metal coating.

For example, in an aspect, the present disclosure provides a light detection and ranging (LIDAR) system for a vehicle. The LIDAR system includes a light source configured to output a transmit beam at a first orientation. The LIDAR system includes at least one splitter configured to split the transmit beam among a plurality of channels. The LIDAR system includes a transmit die comprising a plurality of semiconductor optical amplifiers (SOAs) configured to amplify the transmit beam among the plurality of channels. The LIDAR system includes a reflective surface configured to redirect the transmit beam from the first orientation to a second orientation. The LIDAR system includes a lens interface configured to receive the transmit beam at the first orientation and focus the transmit beam onto the reflective surface. The LIDAR system includes a receiver photonics die disposed above the reflective surface. The receiver photonics die is substantially transparent to the transmit beam. The LIDAR system emits the transmit beam at the second orientation into an environment of the LIDAR system after passing through the receiver photonics die.

In some implementations, the receiver photonics die includes a transmit portion through which the transmit beam passes and a receiving portion offset from the transmit portion, the receiving portion configured to receive a received beam from the environment of the LIDAR system and provide the received beam to at least one photonics component on the receiver photonics die.

In some implementations, the lens interface includes at least a first lens configured to collimate the transmit beam to produce a collimated beam and a second lens configured to focus the collimated beam at a focal point on the reflective surface.

In some implementations, at least one of the plurality of the channels is or includes a local oscillator (LO) channel, wherein the LO channel passes a LO signal to the receiver photonics die without being amplified by the plurality of SOAs.

For example, in an aspect, the present disclosure provides a light detection and ranging (LIDAR) system for a vehicle. The LIDAR system includes a light source configured to output a transmit beam at a first orientation. The LIDAR system includes at least one splitter configured to split the transmit beam among a plurality of channels. The LIDAR system includes a transmit die comprising a plurality of semiconductor optical amplifiers (SOAs) configured to amplify the transmit beam among the plurality of channels. The LIDAR system includes a first reflective surface configured to redirect the transmit beam from the first orientation to a second orientation, wherein the LIDAR system emits the transmit beam at the second orientation into an environment of the LIDAR system. The LIDAR system includes a first lens interface configured to receive the transmit beam at the first orientation and focus the transmit beam onto the first reflective surface. The LIDAR system includes a second reflective surface configured to reflect a received beam at the second orientation from the environment of the LIDAR system and redirect the received beam to the first orientation. The LIDAR system includes a receiver photonics die, wherein the receiver photonics die is substantially coplanar with the transmit die. The LIDAR system includes a second lens interface configured to focus the received beam from the second reflective surface into the receiver photonics die.

In some implementations, the first lens interface is or includes at least a first lens configured to collimate the transmit beam to produce a collimated beam and a second lens configured to focus the collimated beam at a focal point on the first reflective surface.

Other example aspects of the present disclosure are directed to other systems, methods, vehicles, apparatuses, tangible non-transitory computer-readable media, and devices for motion prediction and/or operation of a device including a LIDAR system having a LIDAR module according to example aspects of the present disclosure.

These and other features, aspects and advantages of various implementations of the present disclosure will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

FIG. 7B depicts a side view of a portion of an example transceiver for a LIDAR system according to some implementations of the present disclosure.

FIG. 8 depicts a side view of a portion of an example transceiver for a LIDAR system according to some implementations of the present disclosure.

DETAILED DESCRIPTION

The following describes the technology of this disclosure within the context of an autonomous vehicle for example purposes only. As described herein, the technology is not limited to an autonomous vehicle and can be implemented within other robotic and computing systems as well as various devices. For example, the systems and methods disclosed herein can be implemented in a variety of ways including, but not limited to, a computer-implemented method, an autonomous vehicle system, an autonomous vehicle control system, a robotic platform system, a general robotic device control system, a computing device, etc.

Figure 1:
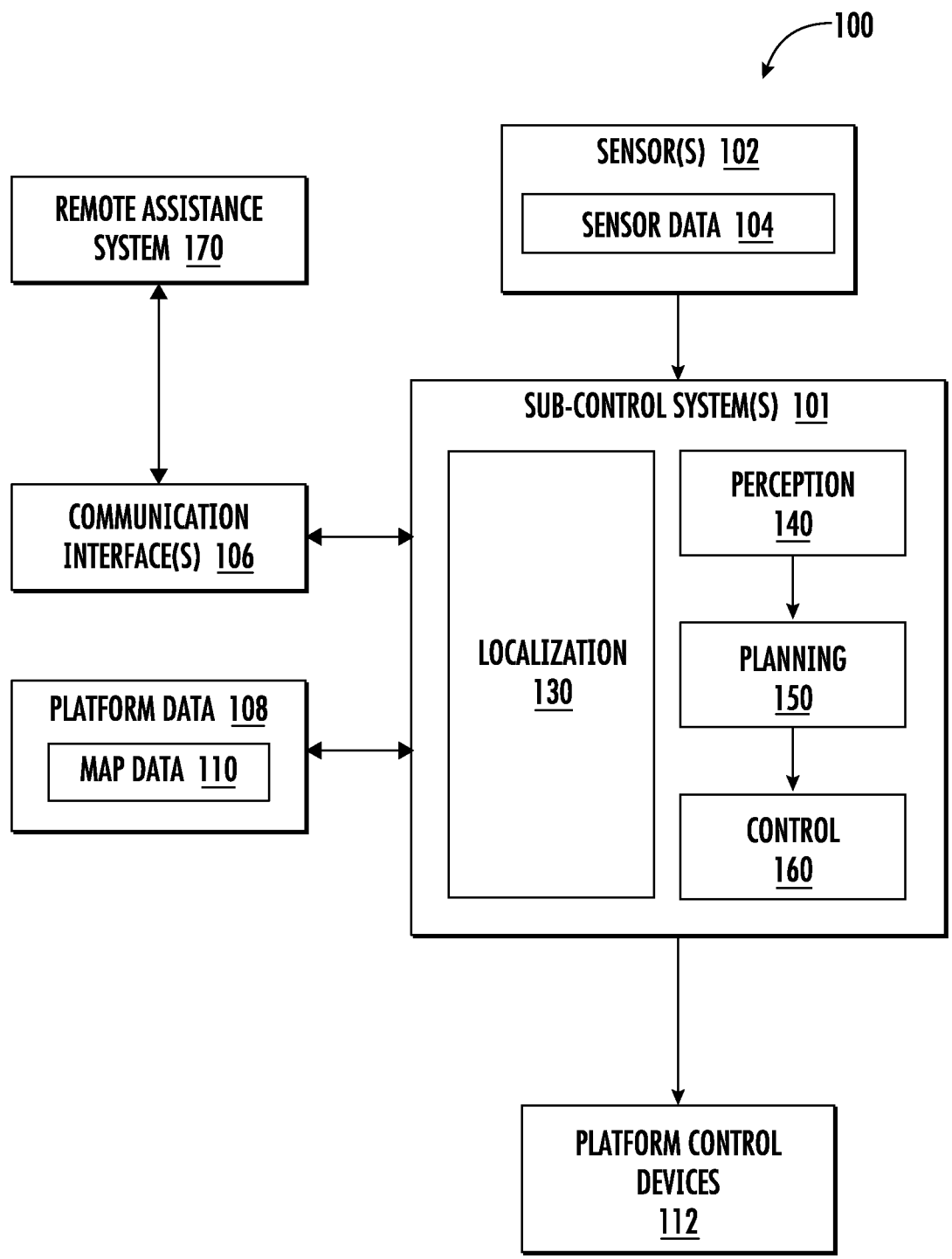
FIG. 1 depicts a block diagram of an example system according to some implementations of the present disclosure.

With reference to FIGS. 1-8, example implementations of the present disclosure are discussed in further detail. FIG. 1 depicts a block diagram of an example autonomous vehicle control system 100 for an autonomous vehicle according to some implementations of the present disclosure. The autonomous vehicle control system 100 can be implemented by a computing system of an autonomous vehicle). The autonomous vehicle control system 100 can include one or more sub-control systems 101 that operate to obtain inputs from sensor(s) 102 or other input devices of the autonomous vehicle control system 100. In some implementations, the sub-control system(s) 101 can additionally obtain platform data 108 (e.g., map data 110) from local or remote storage. The sub-control system(s) 101 can generate control outputs for controlling the autonomous vehicle (e.g., through platform control devices 112, etc.) based on sensor data 104, map data 110, or other data. The sub-control system 101 may include different subsystems for performing various autonomy operations. The subsystems may include a localization system 130, a perception system 140, a planning system 150, and a control system 160. The localization system 130 can determine the location of the autonomous vehicle within its environment; the perception system 140 can detect, classify, and track objects and actors in the environment; the planning system 150 can determine a trajectory for the autonomous vehicle; and the control system 160 can translate the trajectory into vehicle controls for controlling the autonomous vehicle. The sub-control system(s) 101 can be implemented by one or more onboard computing system(s). The subsystems can include one or more processors and one or more memory devices. The one or more memory devices can store instructions executable by the one or more processors to cause the one or more processors to perform operations or functions associated with the subsystems. The computing resources of the sub-control system(s) 101 can be shared among its subsystems, or a subsystem can have a set of dedicated computing resources.

In some implementations, the autonomous vehicle control system 100 can be implemented for or by an autonomous vehicle (e.g., a ground-based autonomous vehicle). The autonomous vehicle control system 100 can perform various processing techniques on inputs (e.g., the sensor data 104, the map data 110) to perceive and understand the vehicle's surrounding environment and generate an appropriate set of control outputs to implement a vehicle motion plan (e.g., including one or more trajectories) for traversing the vehicle's surrounding environment. In some implementations, an autonomous vehicle implementing the autonomous vehicle control system 100 can drive, navigate, operate, etc. with minimal or no interaction from a human operator (e.g., driver, pilot, etc.).

In some implementations, the autonomous vehicle can be configured to operate in a plurality of operating modes. For instance, the autonomous vehicle can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous vehicle can operate in a semi-autonomous operating mode in which the autonomous vehicle can operate with some input from a human operator present in the autonomous vehicle (or a human operator that is remote from the autonomous platform). In some implementations, the autonomous vehicle can enter into a manual operating mode in which the autonomous vehicle is fully controllable by a human operator (e.g., human driver, etc.) and can be prohibited or disabled (e.g., temporary, permanently, etc.) from performing autonomous navigation (e.g., autonomous driving, etc.). The autonomous vehicle can be configured to operate in other modes such as, for example, park or sleep modes (e.g., for use between tasks such as waiting to provide a trip/service, recharging, etc.). In some implementations, the autonomous vehicle can implement vehicle operating assistance technology (e.g., collision mitigation system, power assist steering, etc.), for example, to help assist the human operator of the autonomous platform (e.g., while in a manual mode, etc.).

The autonomous vehicle control system 100 can be located onboard (e.g., on or within) an autonomous vehicle and can be configured to operate the autonomous vehicle in various environments. The environment may be a real-world environment or a simulated environment. In some implementations, one or more simulation computing devices can simulate one or more of: the sensors 102, the sensor data 104, communication interface(s) 106, the platform data 108, or the platform control devices 112 for simulating operation of the autonomous vehicle control system 100.

In some implementations, the sub-control system(s) 101 can communicate with one or more networks or other systems with communication interface(s) 106. The communication interface(s) 106 can include any suitable components for interfacing with one or more network(s), including, for example, transmitters, receivers, ports, controllers, antennas, or other suitable components that can help facilitate communication. In some implementations, the communication interface(s) 106 can include a plurality of components (e.g., antennas, transmitters, or receivers, etc.) that allow it to implement and utilize various communication techniques (e.g., multiple-input, multiple-output (MIMO) technology, etc.).

In some implementations, the sub-control system(s) 101 can use the communication interface(s) 106 to communicate with one or more computing devices that are remote from the autonomous vehicle over one or more network(s). For instance, in some examples, one or more inputs, data, or functionalities of the sub-control system(s) 101 can be supplemented or substituted by a remote system communicating over the communication interface(s) 106. For instance, in some implementations, the map data 110 can be downloaded over a network to a remote system using the communication interface(s) 106. In some examples, one or more of the localization system 130, the perception system 140, the planning system 150, or the control system 160 can be updated, influenced, nudged, communicated with, etc. by a remote system for assistance, maintenance, situational response override, management, etc.

The sensor(s) 102 can be located onboard the autonomous platform. In some implementations, the sensor(s) 102 can include one or more types of sensor(s). For instance, one or more sensors can include image capturing device(s) (e.g., visible spectrum cameras, infrared cameras, etc.). Additionally or alternatively, the sensor(s) 102 can include one or more depth capturing device(s). For example, the sensor(s) 102 can include one or more LIDAR sensor(s) or Radio Detection and Ranging (RADAR) sensor(s). The sensor(s) 102 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of the sensor(s) 102 for capturing depth information can be fixed to a rotational device in order to rotate the sensor(s) 102 about an axis. The sensor(s) 102 can be rotated about the axis while capturing data in interval sector packets descriptive of different portions of a three-hundred-and-sixty-degree view of a surrounding environment of the autonomous platform. In some implementations, one or more of the sensor(s) 102 for capturing depth information can be solid state.

The sensor(s) 102 can be configured to capture the sensor data 104 indicating or otherwise being associated with at least a portion of the environment of the autonomous vehicle. The sensor data 104 can include image data (e.g., 2D camera data, video data, etc.), RADAR data, LIDAR data (e.g., 3D point cloud data, etc.), audio data, or other types of data. In some implementations, the sub-control system(s) 101 can obtain input from additional types of sensors, such as inertial measurement units (IMUs), altimeters, inclinometers, odometry devices, location or positioning devices (e.g., GPS, compass), wheel encoders, or other types of sensors. In some implementations, the sub-control system(s) 101 can obtain sensor data 104 associated with particular component(s) or system(s) of the autonomous vehicle. This sensor data 104 can indicate, for example, wheel speed, component temperatures, steering angle, cargo or passenger status, etc. In some implementations, the sub-control system(s) 101 can obtain sensor data 104 associated with ambient conditions, such as environmental or weather conditions. In some implementations, the sensor data 104 can include multi-modal sensor data. The multi-modal sensor data can be obtained by at least two different types of sensor(s) (e.g., of the sensors 102) and can indicate static and/or dynamic object(s) or actor(s) within an environment of the autonomous vehicle. The multi-modal sensor data can include at least two types of sensor data (e.g., camera and LIDAR data). In some implementations, the autonomous vehicle can utilize the sensor data 104 for sensors that are remote from (e.g., offboard) the autonomous vehicle. This can include for example, sensor data 104 captured by a different autonomous vehicle.

The sub-control system(s) 101 can obtain the map data 110 associated with an environment in which the autonomous vehicle was, is, or will be located. The map data 110 can provide information about an environment or a geographic area. For example, the map data 110 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicating an ideal vehicle path such as along the center of a certain lane, etc.); or any other map data that provides information that assists an autonomous vehicle in understanding its surrounding environment and its relationship thereto. In some implementations, the map data 110 can include high-definition map information. Additionally or alternatively, the map data 110 can include sparse map data (e.g., lane graphs, etc.). In some implementations, the sensor data 104 can be fused with or used to update the map data 110 in real time.

The sub-control system(s) 101 can include the localization system 130, which can provide an autonomous vehicle with an understanding of its location and orientation in an environment. In some examples, the localization system 130 can support one or more other subsystems of the sub-control system(s) 101, such as by providing a unified local reference frame for performing, e.g., perception operations, planning operations, or control operations.

In some implementations, the localization system 130 can determine a current position of the autonomous vehicle. A current position can include a global position (e.g., respecting a georeferenced anchor, etc.) or relative position (e.g., respecting objects in the environment, etc.). The localization system 130 can generally include or interface with any device or circuitry for analyzing a position or change in position of an autonomous vehicle. For example, the localization system 130 can determine position by using one or more of: inertial sensors (e.g., inertial measurement unit(s), etc.), a satellite positioning system, radio receivers, networking devices (e.g., based on IP address, etc.), triangulation or proximity to network access points or other network components (e.g., cellular towers, Wi-Fi access points, etc.), or other suitable techniques. The position of the autonomous vehicle can be used by various subsystems of the sub-control system(s) 101 or provided to a remote computing system (e.g., using the communication interface(s) 106).

In some implementations, the localization system 130 can register relative positions of elements of a surrounding environment of the autonomous vehicle with recorded positions in the map data 110. For instance, the localization system 130 can process the sensor data 104 (e.g., LIDAR data, RADAR data, camera data, etc.) for aligning or otherwise registering to a map of the surrounding environment (e.g., from the map data 110) to understand the autonomous vehicle's position within that environment. Accordingly, in some implementations, the autonomous vehicle can identify its position within the surrounding environment (e.g., across six axes, etc.) based on a search over the map data 110. In some implementations, given an initial location, the localization system 130 can update the autonomous vehicle's location with incremental re-alignment based on recorded or estimated deviations from the initial location. In some implementations, a position can be registered directly within the map data 110.

In some implementations, the map data 110 can include a large volume of data subdivided into geographic tiles, such that a desired region of a map stored in the map data 110 can be reconstructed from one or more tiles. For instance, a plurality of tiles selected from the map data 110 can be stitched together by the sub-control system 101 based on a position obtained by the localization system 130 (e.g., a number of tiles selected in the vicinity of the position).

In some implementations, the localization system 130 can determine positions (e.g., relative or absolute) of one or more attachments or accessories for an autonomous vehicle. For instance, an autonomous vehicle can be associated with a cargo platform, and the localization system 130 can provide positions of one or more points on the cargo platform. For example, a cargo platform can include a trailer or other device towed or otherwise attached to or manipulated by an autonomous vehicle, and the localization system 130 can provide for data describing the position (e.g., absolute, relative, etc.) of the autonomous vehicle as well as the cargo platform. Such information can be obtained by the other autonomy systems to help operate the autonomous vehicle.

The sub-control system(s) 101 can include the perception system 140, which can allow an autonomous platform to detect, classify, and track objects and actors in its environment. Environmental features or objects perceived within an environment can be those within the field of view of the sensor(s) 102 or predicted to be occluded from the sensor(s) 102. This can include object(s) not in motion or not predicted to move (static objects) or object(s) in motion or predicted to be in motion (dynamic objects/actors).

The perception system 140 can determine one or more states (e.g., current or past state(s), etc.) of one or more objects that are within a surrounding environment of an autonomous vehicle. For example, state(s) can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainties associated therewith; or other state information. In some implementations, the perception system 140 can determine the state(s) using one or more algorithms or machine-learned models configured to identify/classify objects based on inputs from the sensor(s) 102. The perception system can use different modalities of the sensor data 104 to generate a representation of the environment to be processed by the one or more algorithms or machine-learned models. In some implementations, state(s) for one or more identified or unidentified objects can be maintained and updated over time as the autonomous vehicle continues to perceive or interact with the objects (e.g., maneuver with or around, yield to, etc.). In this manner, the perception system 140 can provide an understanding about a current state of an environment (e.g., including the objects therein, etc.) informed by a record of prior states of the environment (e.g., including movement histories for the objects therein). Such information can be helpful as the autonomous vehicle plans its motion through the environment.

The sub-control system(s) 101 can include the planning system 150, which can be configured to determine how the autonomous platform is to interact with and move within its environment. The planning system 150 can determine one or more motion plans for an autonomous platform. A motion plan can include one or more trajectories (e.g., motion trajectories) that indicate a path for an autonomous vehicle to follow. A trajectory can be of a certain length or time range. The length or time range can be defined by the computational planning horizon of the planning system 150. A motion trajectory can be defined by one or more waypoints (with associated coordinates). The waypoint(s) can be future location(s) for the autonomous platform. The motion plans can be continuously generated, updated, and considered by the planning system 150.

The planning system 150 can determine a strategy for the autonomous platform. A strategy may be a set of discrete decisions (e.g., yield to actor, reverse yield to actor, merge, lane change) that the autonomous platform makes. The strategy may be selected from a plurality of potential strategies. The selected strategy may be a lowest cost strategy as determined by one or more cost functions. The cost functions may, for example, evaluate the probability of a collision with another actor or object.

The planning system 150 can determine a desired trajectory for executing a strategy. For instance, the planning system 150 can obtain one or more trajectories for executing one or more strategies. The planning system 150 can evaluate trajectories or strategies (e.g., with scores, costs, rewards, constraints, etc.) and rank them. For instance, the planning system 150 can use forecasting output(s) that indicate interactions (e.g., proximity, intersections, etc.) between trajectories for the autonomous platform and one or more objects to inform the evaluation of candidate trajectories or strategies for the autonomous platform. In some implementations, the planning system 150 can utilize static cost(s) to evaluate trajectories for the autonomous platform (e.g., "avoid lane boundaries," "minimize jerk," etc.). Additionally or alternatively, the planning system 150 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). The planning system 150 can rank trajectories based on one or more static costs, one or more dynamic costs, or a combination thereof. The planning system 150 can select a motion plan (and a corresponding trajectory) based on a ranking of a plurality of candidate trajectories. In some implementations, the planning system 150 can select a highest ranked candidate, or a highest ranked feasible candidate.

The planning system 150 can then validate the selected trajectory against one or more constraints before the trajectory is executed by the autonomous platform.

To help with its motion planning decisions, the planning system 150 can be configured to perform a forecasting function. The planning system 150 can forecast future state(s) of the environment. This can include forecasting the future state(s) of other actors in the environment. In some implementations, the planning system 150 can forecast future state(s) based on current or past state(s) (e.g., as developed or maintained by the perception system 140). In some implementations, future state(s) can be or include forecasted trajectories (e.g., positions over time) of the objects in the environment, such as other actors. In some implementations, one or more of the future state(s) can include one or more probabilities associated therewith (e.g., marginal probabilities, conditional probabilities). For example, the one or more probabilities can include one or more probabilities conditioned on the strategy or trajectory options available to the autonomous vehicle. Additionally or alternatively, the probabilities can include probabilities conditioned on trajectory options available to one or more other actors.

To implement selected motion plan(s), the sub-control system(s) 101 can include a control system 160 (e.g., a vehicle control system). Generally, the control system 160 can provide an interface between the sub-control system(s) 101 and the platform control devices 112 for implementing the strategies and motion plan(s) generated by the planning system 150. For instance, the control system 160 can implement the selected motion plan/trajectory to control the autonomous platform's motion through its environment by following the selected trajectory (e.g., the waypoints included therein). The control system 160 can, for example, translate a motion plan into instructions for the appropriate platform control devices 112 (e.g., acceleration control, brake control, steering control, etc.). By way of example, the control system 160 can translate a selected motion plan into instructions to adjust a steering component (e.g., a steering angle) by a certain number of degrees, apply a certain magnitude of braking force, increase/decrease speed, etc. In some implementations, the control system 160 can communicate with the platform control devices 112 through communication channels including, for example, one or more data buses (e.g., controller area network (CAN), etc.), onboard diagnostics connectors (e.g., OBD-II, etc.), or a combination of wired or wireless communication links. The platform control devices 112 can send or obtain data, messages, signals, etc. to or from the sub-control system(s) 101 (or vice versa) through the communication channel(s).

The sub-control system(s) 101 can receive, through communication interface(s) 106, assistive signal(s) from remote assistance system 170. Remote assistance system 170 can communicate with the sub-control system(s) 101 over a network. In some implementations, the sub-control system(s) 101 can initiate a communication session with the remote assistance system 170. For example, the sub-control system(s) 101 can initiate a session based on or in response to a trigger. In some implementations, the trigger may be an alert, an error signal, a map feature, a request, a location, a traffic condition, a road condition, etc.

After initiating the session, the sub-control system(s) 101 can provide context data to the remote assistance system 170. The context data may include sensor data 104 and state data of the autonomous vehicle. For example, the context data may include a live camera feed from a camera of the autonomous vehicle and the autonomous vehicle's current speed. An operator (e.g., human operator) of the remote assistance system 170 can use the context data to select assistive signals. The assistive signal(s) can provide values or adjustments for various operational parameters or characteristics for the sub-control system(s) 101. For instance, the assistive signal(s) can include way points (e.g., a path around an obstacle, lane change, etc.), velocity or acceleration profiles (e.g., speed limits, etc.), relative motion instructions (e.g., convoy formation, etc.), operational characteristics (e.g., use of auxiliary systems, reduced energy processing modes, etc.), or other signals to assist the sub-control system(s) 101.

The sub-control system(s) 101 can use the assistive signal(s) for input into one or more autonomy subsystems for performing autonomy functions. For instance, the planning system 150 can receive the assistive signal(s) as an input for generating a motion plan. For example, assistive signal(s) can include constraints for generating a motion plan. Additionally or alternatively, assistive signal(s) can include cost or reward adjustments for influencing motion planning by the planning system 150. Additionally or alternatively, assistive signal(s) can be considered by the sub-control system(s) 101 as suggestive inputs for consideration in addition to other received data (e.g., sensor inputs, etc.).

The sub-control system(s) 101 may be platform agnostic, and the control system 160 can provide control instructions to platform control devices 112 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figure 2:
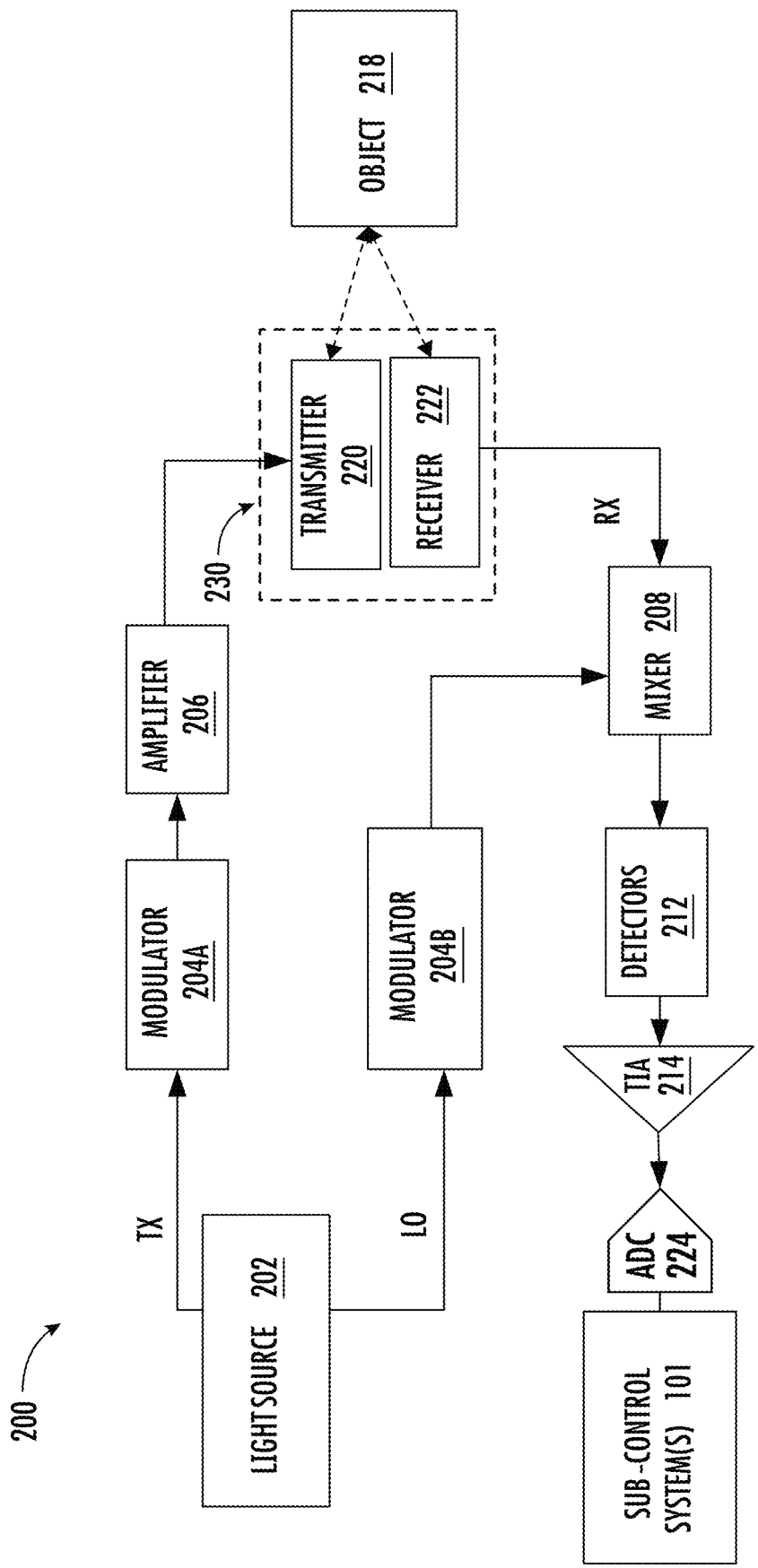
FIG. 2 depicts a block diagram of an example LIDAR system according to some implementations of the present disclosure.

FIG. 2 is a block diagram illustrating an example LIDAR sensor system for autonomous vehicles, according to some implementations. The environment includes a LIDAR system 200 that includes a transmit (Tx) path and a receive (Rx) path. The Tx path includes one or more Tx input/output ports (e.g., channels), and the Rx path includes one or more Rx input/output ports (e.g., channels). In some implementations, a semiconductor substrate and/or semiconductor package may include the Tx path and/or the Rx path. In some implementations, the semiconductor substrate and/or semiconductor package may include at least one of silicon photonics circuitry, programmable logic controller (PLC), or group III-V semiconductor circuitry.

In some implementations, a first semiconductor substrate and/or a first semiconductor package may include the Tx path and a second semiconductor substrate and/or a second semiconductor package may include the Rx path. In some arrangements, the Rx input/output ports and/or the Tx input/output ports may occur (or be formed/disposed/located/placed) along one or more edges of one or more semiconductor substrates and/or semiconductor packages.

The LIDAR system 200 can be coupled to one or more sub-control system(s) 101 (e.g., the sub-control system(s) 101 of FIG. 1). In some implementations, the sub-control system(s) 101 may be coupled to the Rx path via the one or more Rx input/output ports. For instance, the sub-control system(s) 101 can receive LIDAR outputs from the LIDAR system 200. The sub-control system(s) 101 can control a vehicle (e.g., an autonomous vehicle) based on the LIDAR outputs.

The Tx path may include a light source (e.g., laser source) 202, a modulator 204A, a modulator 204B, an amplifier 206, and one or more transmitters 220. The Rx path may include one or more receivers 222, a mixer 208, a detector 212, a transimpedance amplifier (TIA) 214, and one or more analog-to-digital converters (ADCs) 224. Although FIG. 2 shows only a select number of components and only one input/output channel, the LIDAR system 200 may include any number of components and/or input/output channels (in any combination) that are interconnected in any arrangement to facilitate combining multiple functions of a LIDAR system, to support the operation of a vehicle.

The laser source 202 may be configured to generate a light signal (or beam) that is derived from (or associated with) a local oscillator (LO) signal. In some implementations, the light signal may have an operating wavelength that is equal to or substantially equal to 1550 nanometers. In some implementations, the light signal may have an operating wavelength that is between 1400 nanometers and 1440 nanometers.

The laser source 202 may be configured to provide the light signal to the modulator 204A, which is configured to modulate a phase and/or a frequency of the light signal based on a first radio frequency (RF) signal (e.g., an "RF1" signal) to generate a modulated light signal, such as by Continuous Wave (CW) modulation or quasi-CW modulation. The modulator 204A may be configured to send the modulated light signal to the amplifier 206. The amplifier 206 may be configured to amplify the modulated light signal to generate an amplified light signal for transmission via the one or more transmitters 220. The one or more transmitters 220 may include one or more optical waveguides or antennas. In some implementations, modulator 204A and/or modulator 204B may have a bandwidth between 400 megahertz (MHz) and 1000 (MHz).

The LIDAR system 200 includes one or more transmitters 220 and one or more receivers 222. The transmitter(s) 220 and/or receiver(s) 222 can be included in a transceiver 230. The transmitter(s) 220 can provide the transmit beam that it receives from the Tx path into an environment within a given field of view toward an object 218. The one or more receivers 222 can receive a received beam reflected from the object 218 and provide the received beam to the mixer 208 of the Rx path. The one or more receivers 222 may include one or more optical waveguides or antennas. In some arrangements, the one or more transceivers 230 may include a monostatic transceiver or a bistatic transceiver.

The laser source 202 may be configured to provide the LO signal to the modulator 204B, which is configured to modulate a phase and/or a frequency of the LO signal based on a second RF signal (e.g., an "RF2" signal) to generate a modulated LO signal (e.g., using Continuous Wave (CW) modulation or quasi-CW modulation) and send the modulated LO signal to the mixer 208 of the Rx path. The mixer 208 may be configured to mix (e.g., combine, multiply, etc.) the modulated LO signal with the returned signal to generate a down-converted signal and send the down-converted signal to the detector 212.

In some arrangements, the mixer 208 may be configured to send the modulated LO signal to the detector 212. The detector 212 may be configured to generate an electrical signal based on the down-converted signal and send the electrical signal to the TIA 214. In some arrangements, the detector 212 may be configured to generate an electrical signal based on the down-converted signal and the modulated signal. The TIA 214 may be configured to amplify the electrical signal and send the amplified electrical signal to the sub-control system(s) 101 via the one or more ADCs 224. In some implementations, the TIA 214 may have a peak noise-equivalent power (NEP) that is less than 5 picowatts per square root Hertz (i.e., 5×10-12 Watts per square root Hertz). In some implementations, the TIA 214 may have a gain between 4 kiloohms and 25 kiloohms. In some implementations, detector 212 and/or TIA 214 may have a 3-decibel bandwidth between 80 kilohertz (kHz) and 450 megahertz (MHz).

The sub-control system(s) 101 may be configured to determine a distance to the object 218 and/or measure the velocity of the object 218 based on the one or more electrical signals that it receives from the TIA 214 via the one or more ADCs 224.

Figure 3:
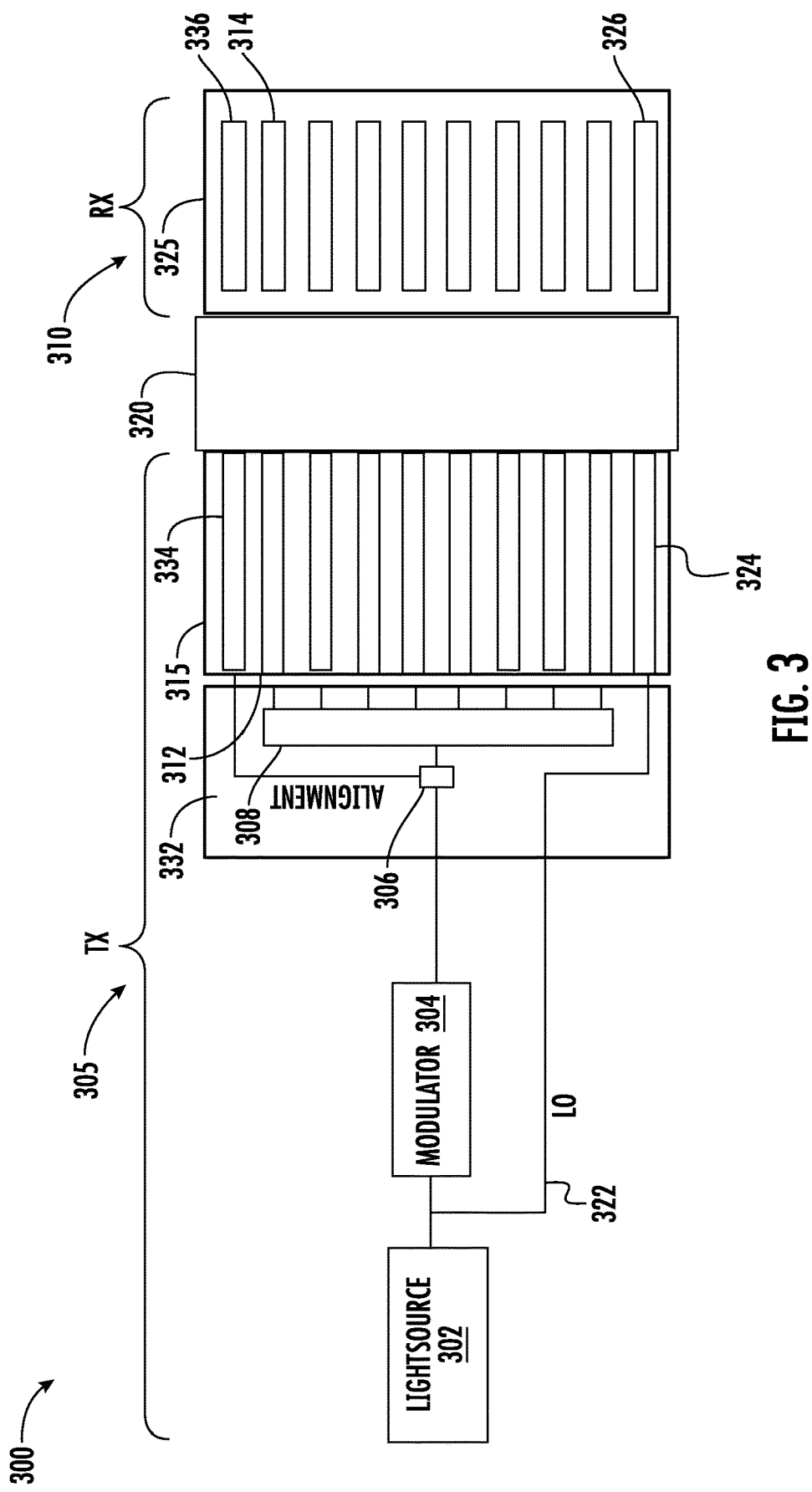
FIG. 3 depicts a block diagram of a portion of an example transceiver for a LIDAR system according to some implementations of the present disclosure.

FIG. 3 depicts a block diagram of a portion of an example transceiver 300 for a LIDAR system according to some implementations of the present disclosure. The transceiver 300 can be included in a LIDAR system, such as the LIDAR system 200 of FIG. 2 (e.g., as the transceiver 230).

The transceiver 300 can include a transmitter 305 (e.g., a Tx path) and a receiver 310 (e.g., an Rx path). The transmitter 305 can include or otherwise be in signal communication with a light source (e.g., laser source) 302. The light source 302 can be configured to provide a beam (e.g., a laser beam) to the transmitter 305. In some implementations, a local oscillator (LO) signal 322 may be drawn from the light source 302. The LO signal 322 may be equivalent to the signal from the light source 302 or may be modulated from the signal from the light source 302 (e.g., by an LO modulator such as modulator 204B of FIG. 2). In some implementations, a splitter can split the beam from light source 302 into a first portion provided as the LO signal 322 and a second portion provided to other components of the transceiver 300.

The receiver 310 can include a receiver photonics die 325 configured to receive a received beam from the environment. The received beam can be provided among a plurality of receive channels 314, where each receive channel 314 captures a portion of a common transmit beam after being reflected by a corresponding point in the environment. In addition to the receive channels 314, the receiver photonics die 325 can include an LO channel 326 configured to receive the LO signal 322 from the transmitter 305 and an alignment channel 336 for facilitating alignment with the transmitter 305.

The light source 302 can provide the beam to a modulator 304 (e.g., a phase modulator). The modulator 304 can be configured to modulate the beam to modify a phase and/or a frequency of the beam. In some embodiments, the modulator 304 can be a silicon phase modulator. The modulator 304 can modulate the beam by, for example, using Continuous Wave (CW) modulation or quasi-CW modulation. In some implementations, the modulator 304 can be disposed on a transmit die or another suitable substrate.

The transceiver 300 can further include one or more splitters configured to split the beam from the light source 302 among one or more channels 312, 324, and 334. For instance, a splitter 308 (e.g., an optical splitter) can split the beam from the light source 302 among a plurality of transmit channels 312 that each carry a portion of the beam from the light source 302. For instance, each transmit channel 312 may correspond to respective transmit output (e.g., Tx0, Tx1, etc.). Each transmit channel 312 can provide a portion of the beam to a respective portion of the environment of a LIDAR system such that the LIDAR system can scan multiple proximate points simultaneously. In addition to the transmit channels 312, a LO channel 324 can provide the LO signal 322 to the receiver photonics die 325 as the LO channel 326.

Furthermore, a splitter 306 can split an alignment signal 332 from the beam from the light source. The splitter 306 can be, for example, a 1×2 optical splitter. The alignment signal 332 can be provided to an alignment channel 334. When the transmitter 305 and the receiver 310 are properly aligned, the alignment signal 332 can successfully pass from the alignment channel 334 of the transmitter 305 to the alignment channel 336 of the receiver 310. In this manner, the alignment channels 334 and 336 can be used to evaluate proper alignment of the transceiver 300.

The transceiver 300 can include one or more amplifiers configured to receive the beam from the light source 302 and amplify the beam. The amplifiers may be, for example, semiconductor optical amplifiers (SOAs). For instance, the transceiver 300 can include a transmit die 315 which includes the one or more amplifiers (e.g., SOAs). In some embodiments, the amplifiers may be disposed in each of the transmit channels 312. Furthermore, in some embodiments, amplifiers may not be disposed in the alignment channel 334 and/or the LO channel 324. In this manner, the LO channel 324 can pass the LO signal 322 to the receiver photonics die 325 without being amplified by the plurality of SOAs. The transmit die 315 may or may not include other components of the transmitter 305 or transmit path, such as, for example, the light source 302, the modulator 304, or the splitters 306, 308.

According to example aspects of the present disclosure, the beam can pass from the transmit die 315 to the receiver photonics die 325 without entering a narrow waveguide. In particular, the transceiver 300 can include a photonics interface 320 configured to interface the beam between the transmit die 315 and the receiver photonics die 325 by emitting the beam into free space and receiving the beam reflected from the free space. Example configurations of the photonics interface 320 are described in greater detail with respect to FIGS. 4-7B.

Figure 4:
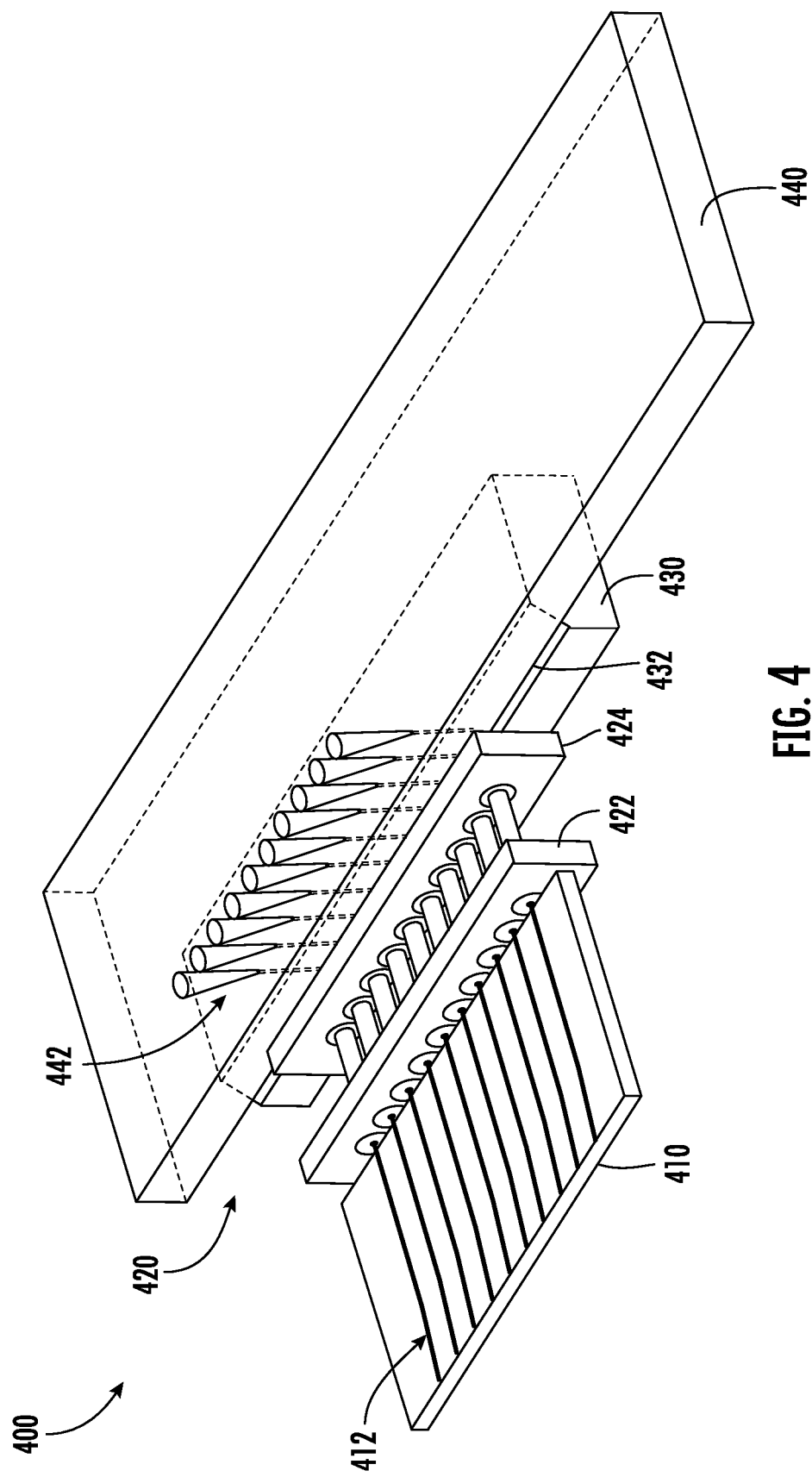
FIG. 4 depicts a perspective view of a portion of an example transceiver for a LIDAR system according to some implementations of the present disclosure.

FIG. 4 depicts a perspective view of a portion of an example transceiver 400 for a LIDAR system according to some implementations of the present disclosure. The transceiver 400 can include a transmit die 410 having a plurality of channels 412. The transmit die 410 can be configured to receive a transmit beam from a light source (not illustrated) that is configured to output the transmit beam. The transmit beam may be split among the plurality of channels 412. The transceiver 400 can additionally include a modulator configured to receive the transmit beam from the light source and modify at least one of phase or frequency of the transmit beam. Additionally or alternatively, the transceiver 400 can include one or more amplifiers configured to receive the transmit beam from the light source and amplify the transmit beam. The amplifiers may be disposed subsequent to the modulators in relation to the direction of travel of the transmit beam. As an example, in some implementations, the amplifiers may be respective to the channels 412 of the transmit die 410. The transmit die 410 may be composed of any suitable material, such as, for example, a group III-V semiconductor material.

The light source can be configured to output the transmit beam at a first orientation. For instance, the first orientation may be generally coplanar with the transmit die 410 and/or the plurality of channels 412. The first orientation may be, for example, an angular orientation generally describing direction of movement of photons in the transmit beam. The first orientation may be described with respect to any suitable consistent reference.

The transceiver 400 can further include a reflective surface 432 configured to redirect the transmit beam from the first orientation to a second orientation. For instance, the beam may be provided from the transmit die 410 such that the beam is incident on the reflective surface 432. The reflective surface 432 may then redirect photons incident on the reflective surface 432 from the first orientation to the second orientation. In some implementations, the second orientation is normal or substantially normal (e.g., within about 10 degrees of normal) to the first orientation. As one example, the second orientation may be normal to or substantially normal to a plane generally coplanar with the transmit die 410. The LIDAR system can emit the transmit beam at the second orientation into an environment of the LIDAR system. For instance, the second orientation may be generally directed away from the LIDAR system and/or the AV. The second orientation may be directed in a direction associated with optics or other gap in a housing of the LIDAR system.

In some implementations, the reflective surface 432 can be a flat surface (or planar surface). For instance, the portion of the reflective surface 432 upon which the beam is incident may be substantially flat or planar. As one example, a plane may be generally fit to the reflective surface 432 or a portion of the reflective surface 432 upon which the beam is incident. As another example, the reflective surface 432 may have a depth, where the depth of the reflective surface 432 is negligible. Additionally or alternatively, in some implementations, the reflective surface 432 can be a concave surface. For instance, the reflective surface 432 can define a curvature across a surface of the substrate 430 on which the reflective surface 432 is arranged. The reflective surface 432 can have a center of curvature or focal point arranged such that the beam is reflected at a substantially orthogonal angle.

To provide the transmit beam to the reflective surface 432, the transceiver 400 can include a lens interface 420. The lens interface 420 can be configured to receive the transmit beam at the first orientation and focus the transmit beam onto the reflective surface 432. For instance, the lens interface 420 can include one or more lenses that are aligned with the plurality of channels 412. As one example, a centroid of the lenses in the lens interface 420 may be substantially co-located with the central axes of the channels 412. In some implementations, the lens interface 420 can include at least one first lens 422 configured to collimate the transmit beam to produce a collimated beam. The at least one first lens 422 can be a plurality of first lenses 422 respectively associated with the channels 412. The lens interface 420 can further include at least one second lens 424 configured to focus the collimated beam at a focal point on the reflective surface 432. For instance, the at least one second lens 424 can be a plurality of second lenses 424 respectively associated with the channels 412. Collimating and focusing the beam respective to the channels 412 can provide for reduced divergence in the transmit beam(s) and improved detection fidelity.

The transceiver 400 can further include a receiver photonics die 440. The receiver photonics die 440 can be configured to receive a received beam (e.g., respective to the plurality of channels 412) from the environment. To provide for tightly controlled correlation between the transmit beam and the received beam, the receiver photonics die 440 can be disposed above the reflective surface 432 such that the transmit beam passes through the receiver photonics die 440 after being reflected by the reflective surface 432. For instance, the receiver photonics die 440 can include a transmit portion 442 through which the transmit beam passes after being reflected by the reflective surface 432. As used herein, "above" is intended to be defined relative to the direction traveled by the beam in the second orientation. For instance, the receiver photonics die 440 may be disposed above the reflective surface 432 if the transmit beam passes through the receiver photonics die 440 after being reflected by the reflective surface 432, even if the receiver photonics die 440 is not above the reflective surface 432 relative to earth gravity or another contrasting reference.

In some implementations, the reflective surface 432 may be disposed on a substrate 430. The substrate 430 may be separate from the transmit die 410 and/or the receiver photonics die 440. The reflective surface 432 may be formed by a reflective coating on the substrate 430. As one example, the reflective coating may be a metal coating. The substrate 430 may be generally parallel to the receiver photonics die 440. Furthermore, the reflective surface 432 may be formed on an angled edge of the substrate. For instance, a plane that is coplanar to the reflective surface 432 may be neither parallel nor orthogonal to planes defining the transmit die 410, the receiver photonics die 440, or the substrate 430.

Figure 5A:
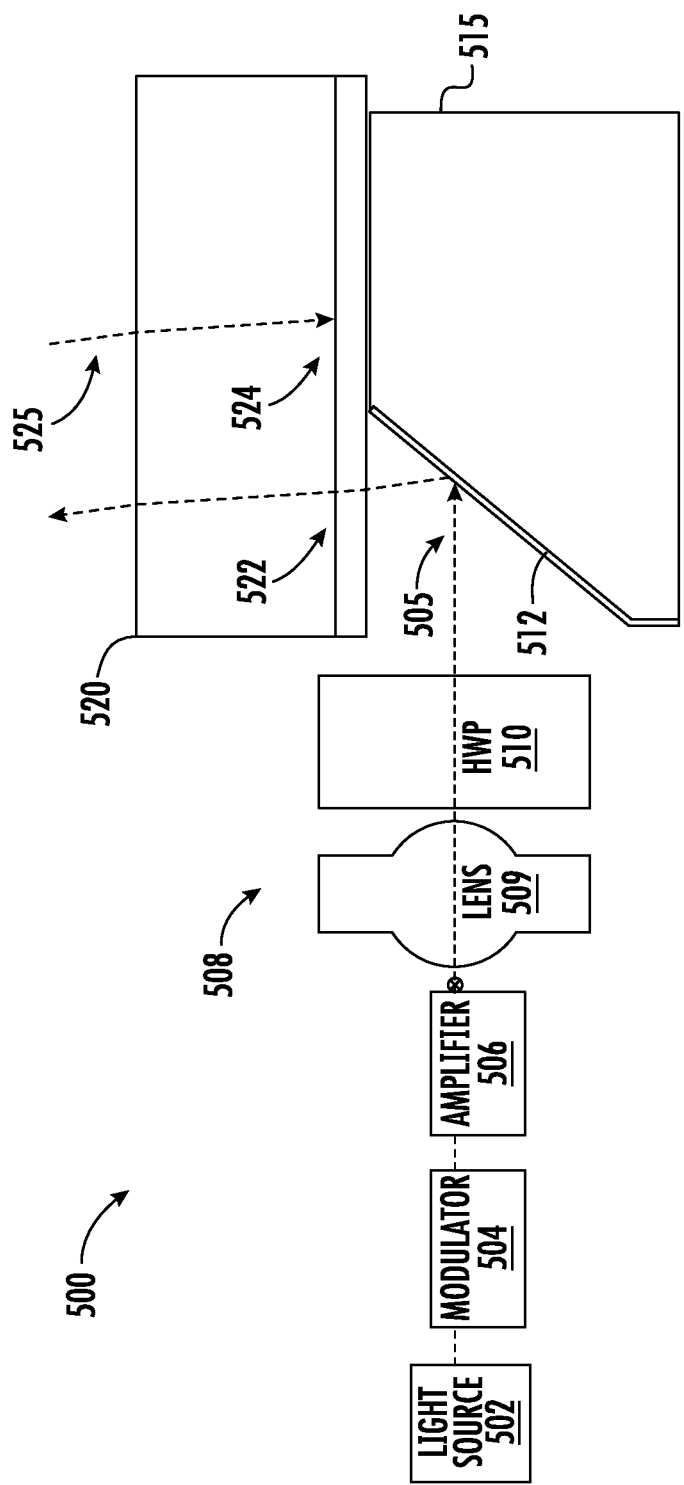
FIG. 5A depicts a side view of a portion of an example transceiver for a LIDAR system according to some implementations of the present disclosure.

FIG. 5A depicts a side view of a portion of an example transceiver 500 for a LIDAR system according to some implementations of the present disclosure. The transceiver 500 can include a light source 502. The light source 502 can be configured to provide a transmit beam 505 (e.g., a laser beam) to downstream components of the transceiver 500.

For instance, the light source 502 can provide the transmit beam 505 to a modulator 504 (e.g., a phase modulator). The modulator 504 can be configured to modulate the transmit beam 505 to modify a phase and/or a frequency of the transmit beam 505. In some embodiments, the modulator 504 can be a silicon phase modulator. The modulator 504 can modulate the transmit beam 505 by, for example, using Continuous Wave (CW) modulation or quasi-CW modulation. In some implementations, the modulator 504 can be disposed on a transmit die or another suitable substrate. The transceiver 500 can include one or more amplifiers 506 configured to receive the transmit beam 505 from the light source 502 or the modulator 504 and amplify the transmit beam 505. The amplifier(s) 506 may be, for example, semiconductor optical amplifiers (SOAs). As one example, the transceiver 500 may include a plurality of amplifiers 506 respective to a plurality of channels.

The transceiver 500 can further include a lens interface 508. The lens interface 508 can be configured to focus the transmit beam 505 from the amplifier(s) 506 onto a reflective surface 512. The reflective surface 512 may be a coating (e.g., a metal coating) on a substrate 515. For instance, the transmit beam 505 may be provided by the lens interface 508 such that the transmit beam 505 is incident on the reflective surface 512. The reflective surface 512 may then redirect photons incident on the reflective surface 512 from the first orientation to the second orientation. In some implementations, the second orientation is normal or substantially normal (e.g., within about 10 degrees of normal) to the first orientation. As one example, the second orientation may be normal to or substantially normal to a plane generally coplanar with a die including the amplifier(s) 506. The LIDAR system can emit the transmit beam 505 at the second orientation into an environment of the LIDAR system. For instance, the second orientation may be generally directed away from the LIDAR system and/or the AV. The second orientation may be directed in a direction associated with optics or other gap in a housing of the LIDAR system.

The reflective surface 512 can be a flat surface (or planar surface). For instance, the portion of the reflective surface 512 upon which the transmit beam 505 is incident may be substantially flat or planar. As one example, a plane may be generally fit to the reflective surface 512 or a portion of the reflective surface 512 upon which the transmit beam 505 is incident. As another example, the reflective surface 512 may have a depth, where the depth of the reflective surface 512 is negligible.

The lens interface 508 can include one or more lenses 509. For instance, in some implementations, the lens interface 508 can include at least a first lens configured to collimate the transmit beam 505 to produce a collimated beam and a second lens configured to focus the collimated beam at a focal point on the reflective surface 512. The transceiver 500 can further include a half-wave plate (HWP) 510 configured to shift a polarization direction of the transmit beam 505. The HWP 510 can be constructed out of a birefringent material (e.g., quartz, mica, or plastic), for which the index of refraction is different for light linearly polarized along one or the other of two perpendicular crystal axes. The HWP 510 can provide for improved capability of isolating light emitted by the LIDAR system from other light in the environment.

The transceiver 500 can further include a receiver photonics die 520. The receiver photonics die 520 can be configured to receive a received beam 525 (e.g., respective to a plurality of channels) from the environment. To provide for tightly controlled correlation between the transmit beam 505 and the received beam 525, the receiver photonics die 520 can be disposed above the reflective surface 512 such that the transmit beam 505 passes through the receiver photonics die 520 after being reflected by the reflective surface 512. For instance, the receiver photonics die 520 can include a transmit portion 522 through which the transmit beam 505 passes after being reflected by the reflective surface 512. As used herein, "above" is intended to be defined relative to the direction traveled by the transmit beam 505 in the second orientation. For instance, the receiver photonics die 520 may be disposed above the reflective surface 512 if the transmit beam 505 passes through the receiver photonics die 520 after being reflected by the reflective surface 512, even if the receiver photonics die 520 is not above the reflective surface 512 relative to earth gravity or another contrasting reference.

In addition, the receiver photonics die 520 can include a receiving portion 524 offset from the transmit portion 522. The receiving portion 524 can be configured to receive the received beam 525 from the environment of the LIDAR system and provide the received beam 525 to at least one photonics component on the receiver photonics die 520 and/or downstream components of the LIDAR system (e.g., a mixer or signal processing photonics). For instance, the receiving portion 524 may not be transparent to the received beam 525. As one example, the receiving portion 524 may be formed by a waveguide or other light-steering component. As another example, the interface between the substrate 515 and the receiver photonics die 520 may not be transparent to the received beam 525.

Figure 5B:
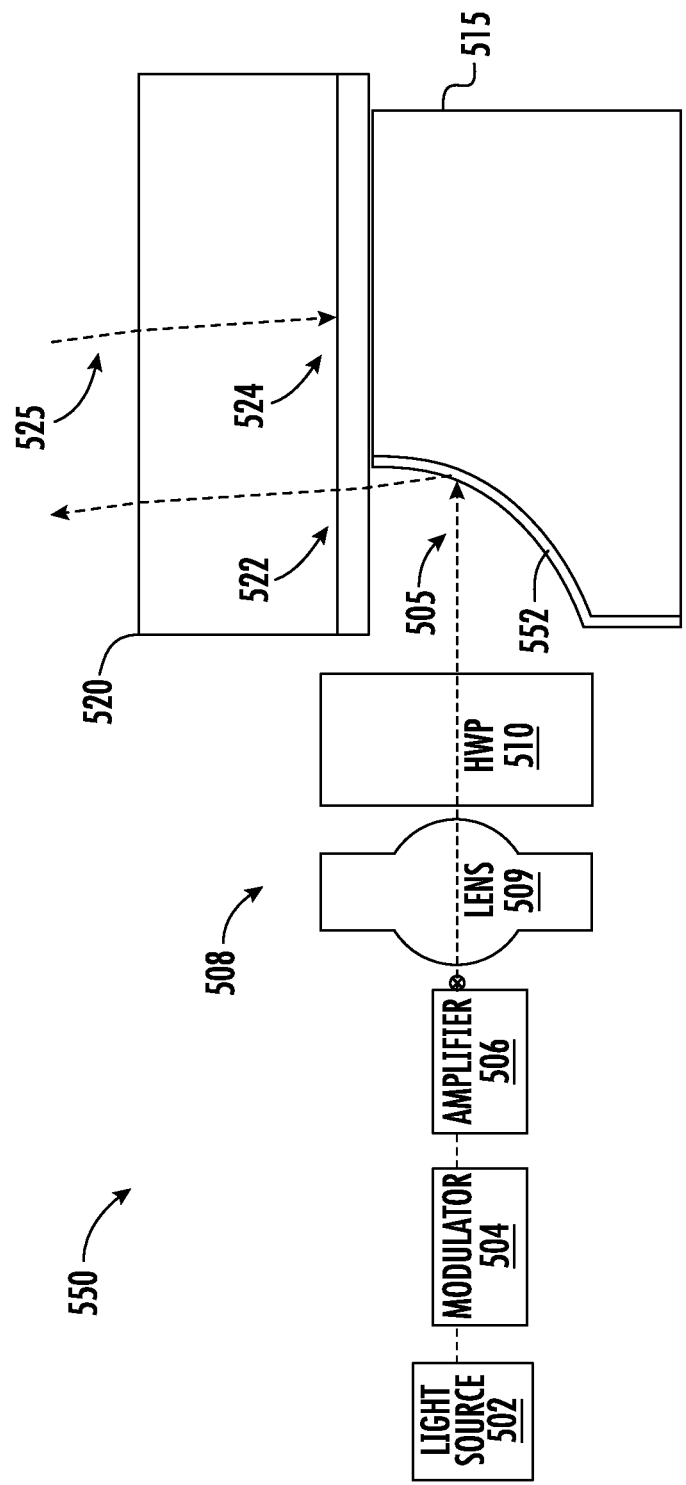
FIG. 5B depicts a side view of a portion of an example transceiver for a LIDAR system according to some implementations of the present disclosure.

FIG. 5B depicts a side view of a portion of an example transceiver 550 for a LIDAR system according to some implementations of the present disclosure. The transceiver 550 includes various components discussed with reference to FIG. 5A, which are denoted with like reference numbers. Unless otherwise indicated, aspects discussed with reference to FIG. 5A are equally intended to apply to the embodiment depicted in FIG. 5B.

The transceiver 550 of FIG. 5B can include a reflective surface 552. The reflective surface 552 of FIG. 5B can be similar to the reflective surface 512 of FIG. 5A. Unlike the reflective surface 512 of FIG. 5A, the reflective surface 552 can be a concave surface. For instance, the reflective surface 552 can define a curvature across a surface of the substrate 515. The reflective surface 552 can have a center of curvature or focal point arranged such that the transmit beam 505 is reflected at a substantially orthogonal angle.

Figure 6:
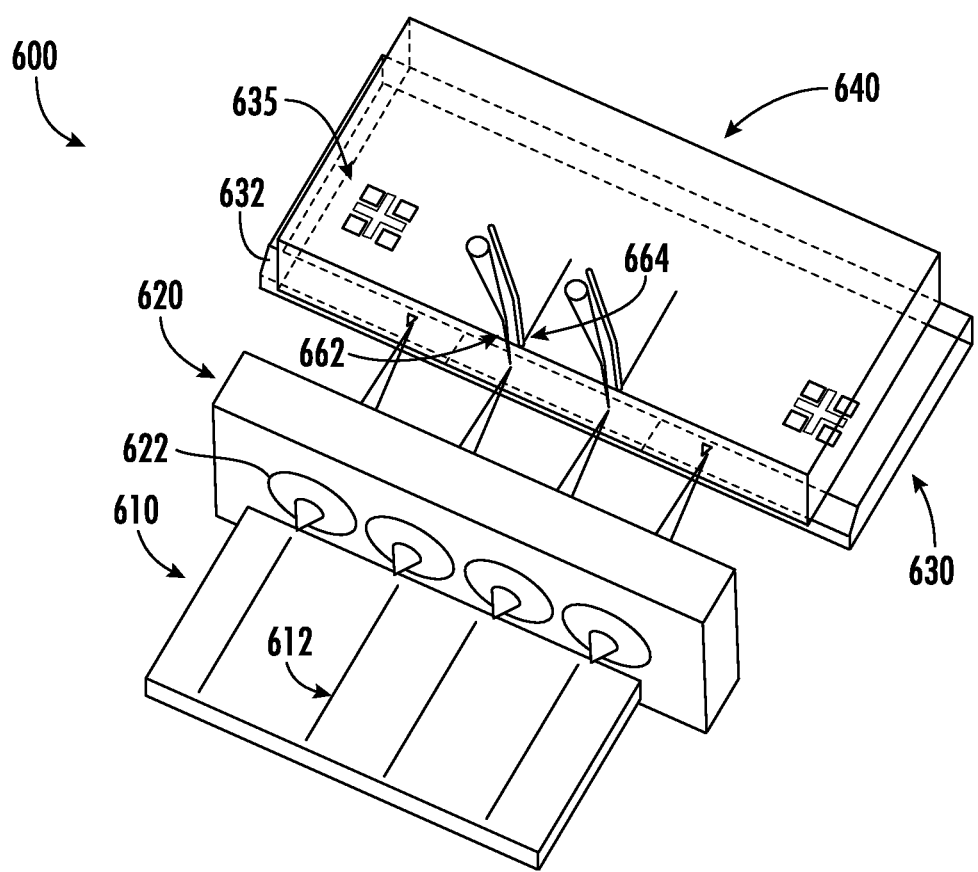
FIG. 6 depicts a perspective view of a portion of an example transceiver for a LIDAR system according to some implementations of the present disclosure.

FIG. 6 depicts a perspective view of a portion of an example transceiver 600 for a LIDAR system according to some implementations of the present disclosure. The transceiver 600 can include a transmit die 610 having a plurality of channels 612. The transmit die 610 can be configured to receive a transmit beam from a light source (not illustrated) that is configured to output the transmit beam. The transmit beam may be split among the plurality of channels 612. The transceiver 600 can additionally include a modulator configured to receive the transmit beam from the light source and modify at least one of phase or frequency of the transmit beam. Additionally or alternatively, the transceiver 600 can include one or more amplifiers configured to receive the transmit beam from the light source and amplify the transmit beam. The amplifiers may be disposed subsequent to the modulators in relation to the direction of travel of the transmit beam. As an example, in some implementations, the amplifiers may be respective to the channels 612 of the transmit die 610. The transmit die 610 may be composed of any suitable material, such as, for example, a group III-V semiconductor material.

The light source can be configured to output the transmit beam at a first orientation. For instance, the first orientation may be generally coplanar with the transmit die 610 and/or the plurality of channels 612. The first orientation may be, for example, an angular orientation generally describing direction of movement of photons in the transmit beam. The first orientation may be described with respect to any suitable consistent reference.

The transceiver 600 can further include a reflective surface 632 configured to redirect the transmit beam from the first orientation to a second orientation. For instance, the beam may be provided from the transmit die 610 such that the beam is incident on the reflective surface 632. The reflective surface 632 may then redirect photons incident on the reflective surface 632 from the first orientation to the second orientation. In some implementations, the second orientation is normal or substantially normal (e.g., within about 10 degrees of normal) to the first orientation. As one example, the second orientation may be normal to or substantially normal to a plane generally coplanar with the transmit die 610. The LIDAR system can emit the transmit beam at the second orientation into an environment of the LIDAR system. For instance, the second orientation may be generally directed away from the LIDAR system and/or the AV. The second orientation may be directed in a direction associated with optics or other gap in a housing of the LIDAR system.

In some implementations, the reflective surface 632 can be a flat surface (or planar surface). For instance, the portion of the reflective surface 632 upon which the beam is incident may be substantially flat or planar. As one example, a plane may be generally fit to the reflective surface 632 or a portion of the reflective surface 632 upon which the beam is incident. As another example, the reflective surface 632 may have a depth, where the depth of the reflective surface 632 is negligible. Additionally or alternatively, in some implementations, the reflective surface 632 can be a concave surface. For instance, the reflective surface 632 can define a curvature across a surface of the substrate 630. The reflective surface 632 can have a center of curvature or focal point arranged such that the beam is reflected at a substantially orthogonal angle.

To provide the transmit beam to the reflective surface 632, the transceiver 600 can include a lens interface 620. The lens interface 620 can be configured to receive the transmit beam at the first orientation and focus the transmit beam onto the reflective surface 632. For instance, the lens interface 620 can include one or more lenses 622 that are aligned with the plurality of channels 612. As one example, a centroid of the lenses 622 in the lens interface 620 may be substantially co-located with the central axes of the channels 612.

The transceiver 600 can further include a receiver photonics die 640. The receiver photonics die 640 can be configured to receive a received beam (e.g., respective to the plurality of channels 612) from the environment. To provide for tightly controlled correlation between the transmit beam and the received beam, the receiver photonics die 640 can be disposed above the reflective surface 632 such that the transmit beam passes through the receiver photonics die 640 after being reflected by the reflective surface 632. For instance, the receiver photonics die 640 can include a transmit portion 662 through which the transmit beam passes after being reflected by the reflective surface 632. As used herein, "above" is intended to be defined relative to the direction traveled by the beam in the second orientation. For instance, the receiver photonics die 640 may be disposed above the reflective surface 632 if the transmit beam passes through the receiver photonics die 640 after being reflected by the reflective surface 632, even if the photonics die 640 is not above the reflective surface 632 relative to earth gravity or another contrasting reference.

In addition, the receiver photonics die 640 can include a receiving portion 664 offset from a transmit portion 662. The receiving portion 664 can be configured to receive the received beam from the environment of the LIDAR system and provide the received beam to at least one photonics component on the receiver photonics die 640 and/or downstream components of the LIDAR system (e.g., a mixer or signal processing photonics). For instance, the receiving portion 664 may not be transparent to the received beam. As one example, the receiving portion 664 may be formed by a waveguide or other light-steering component.

In some implementations, the reflective surface 632 may be disposed on a substrate 630. The substrate 630 may be separate from the transmit die 610 and/or the receiver photonics die 640. The reflective surface 632 may be formed by a reflective coating on the substrate 630. As one example, the reflective coating may be a metal coating. The substrate 630 may be generally parallel to the receiver photonics die 640. Furthermore, the reflective surface 632 may be formed on an angled edge of the substrate. For instance, a plane that is coplanar to the reflective surface 632 may be neither parallel nor orthogonal to planes defining the transmit die 610, the receiver photonics die 640, or the substrate 630.

The substrate 630 and the receiver photonics die 640 can each include one or more alignment guides 635 indicating an alignment between the substrate 630 and the receiver photonics die 640. For instance, the alignment guides 635 can be a common or correlated pattern between the substrate 630 and the receiver photonics die 640. The alignment guides 635 can therefore be measured during manufacturing to indicate when the substrate 630 and the receiver photonics die 640 are properly aligned. As one example, the alignment guides 635 may be formed by photolithography or other high-precision process such that the alignment guides 635 can provide a level of precision that satisfies strict constraints associated with the present LIDAR systems.

Figure 7A:
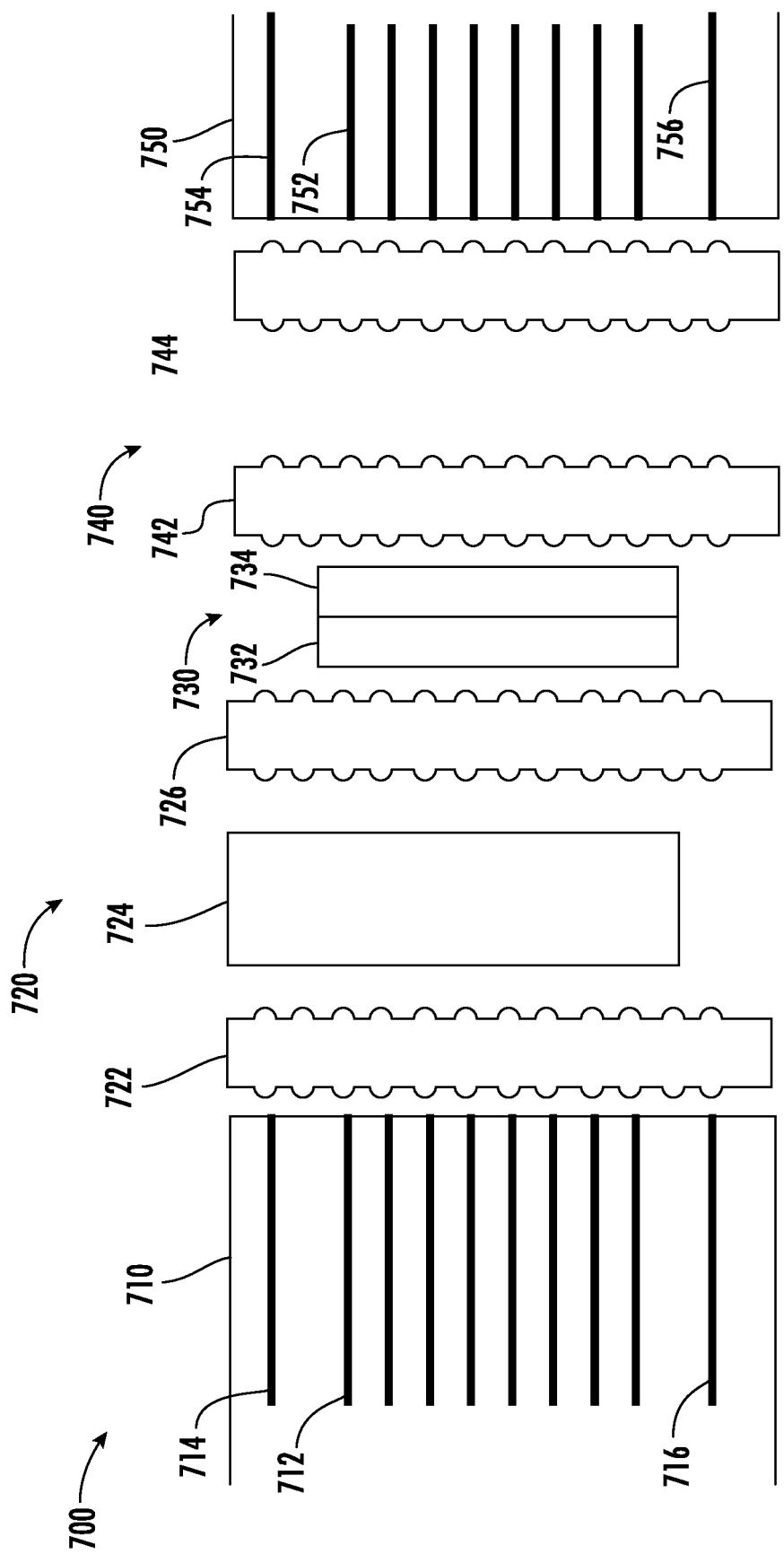
FIG. 7A depicts a top view of a portion of an example transceiver for a LIDAR system according to some implementations of the present disclosure.

FIG. 7A depicts a top view of a portion of an example transceiver 700 for a LIDAR system according to some implementations of the present disclosure. Furthermore, FIG. 7B depicts a side view of a portion of the example transceiver 700 of FIG. 7A according to some implementations of the present disclosure.

The transceiver 700 can include a transmit die 710 having a plurality of channels 715, including one or more transmit channels 712, an alignment channel 714, and an LO channel 716. The transmit die 710 can be configured to receive a transmit beam 762 from a light source (not illustrated) that is configured to output the transmit beam 762. The transmit beam 762 may be split among the plurality of channels 715. The transceiver 700 can additionally include a modulator configured to receive the transmit beam 762 from the light source and modify at least one of phase or frequency of the transmit beam 762. Additionally or alternatively, the transceiver 700 can include one or more amplifiers configured to receive the transmit beam 762 from the light source and amplify the transmit beam 762. The amplifiers may be disposed subsequent to the modulators in relation to the direction of travel of the transmit beam 762. As an example, in some implementations, the amplifiers may be respective to the transmit channels 712 of the transmit die 710. The transmit die 710 may be composed of any suitable material, such as, for example, a group III-V semiconductor material.

The light source can be configured to output the transmit beam 762 at a first orientation. For instance, the first orientation may be generally coplanar with the transmit die 710 and/or the plurality of channels 715. The first orientation may be, for example, an angular orientation generally describing direction of movement of photons in the transmit beam 762. The first orientation may be described with respect to any suitable consistent reference.

The transceiver 700 can further include a first reflective surface 732 configured to redirect the transmit beam 762 from the first orientation to a second orientation. For instance, the beam may be provided from the transmit die 710 such that the beam is incident on the first reflective surface 732. The first reflective surface 732 may then redirect photons incident on the first reflective surface 732 from the first orientation to the second orientation. In some implementations, the second orientation is normal or substantially normal (e.g., within about 10 degrees of normal) to the first orientation. As one example, the second orientation may be normal to or substantially normal to a plane generally coplanar with the transmit die 710. The LIDAR system can emit the transmit beam 762 at the second orientation into an environment of the LIDAR system. For instance, the second orientation may be generally directed away from the LIDAR system and/or the AV. The second orientation may be directed in a direction associated with optics or other gap in a housing of the LIDAR system.

To provide the transmit beam 762 to the first reflective surface 732, the transceiver 700 can include a first lens interface 720. The first lens interface 720 can be configured to receive the transmit beam 762 at the first orientation and focus the transmit beam 762 onto the first reflective surface 732. For instance, the first lens interface 720 can include one or more lenses that are aligned with the plurality of channels 715. As one example, a centroid of the lenses in the first lens interface 720 may be substantially co-located with the central axes of the channels 715. In some implementations, the first lens interface 720 can include at least one first lens 722 configured to collimate the transmit beam 762 to produce a collimated beam. The at least one first lens 722 can be a plurality of first lenses 722 respectively associated with the channels 715. The first lens interface 720 can further include a half-wave plate (HWP) 724 configured to shift a polarization direction of the transmit beam 762. The HWP 724 can be constructed out of a birefringent material (e.g., quartz, mica, or plastic), for which the index of refraction is different for light linearly polarized along one or the other of two perpendicular crystal axes. The HWP 724 can provide for improved capability of isolating light emitted by the LIDAR system from other light in the environment. The first lens interface 720 can additionally include at least one second lens 726 configured to focus the collimated beam at a focal point on the reflective surface 732. For instance, the at least one second lens 726 can be a plurality of second lenses 726 respectively associated with the channels 715. Collimating and focusing the beam respective to the channels 715 can provide for reduced divergence in the transmit beam 762(s) and improved detection fidelity.

The transceiver 700 can further include a receiver photonics die 750. The receiver photonics die 750 can be configured to receive a received beam 764 (e.g., respective to the plurality of channels 715) from the environment. To provide for tightly controlled correlation between the transmit beam 762 and the received beam 764, the receiver photonics die 750 can be substantially coplanar with the transmit die 710. Furthermore, to pass the beam from the transmit die 710 to the receiver photonics die 750, the transceiver 700 can pass the signal from the alignment channel 714 and LO channel 716 of the transmit die 710 to corresponding alignment channel 754 and LO channel 756 of the receiver photonics die 750 (e.g., without being reflected by the first reflective surface 732).

Additionally, the transceiver 700 can further include a second reflective surface 734 configured to receive a received beam 764 from the environment of the LIDAR system and provide the received beam 764 among a plurality of receive channels 752. The received beam 764 can be received at the second orientation and redirected by the second reflective surface 734 from the second orientation to the first orientation. The transceiver 700 can additionally include a second lens interface 740 configured to focus the received beam 764 into the receiver photonics die 750. In some implementations, the second lens interface 740 can include at least one first lens 742 configured to collimate the transmit beam 762 to produce a collimated beam. The at least one first lens 742 can be a plurality of first lenses 742 respectively associated with channels 755 of the receiver photonics die 750. The second lens interface 740 can further include at least one second lens 744 configured to focus the collimated beam at a focal point on the reflective surface 432. For instance, the at least one second lens 744 can be a plurality of second lenses 744 respectively associated with the channels 755. Collimating and focusing the beam respective to the channels 755 can provide for reduced divergence in the transmit beam 762(s) and improved detection fidelity.

For instance, the portion of the beam from the transmit channels 712 can be focused by the first lens interface 720 onto the first reflective surface 732, emitted into free space, reflected off of objects in the free space such that the beam is incident on the second reflective surface 734, reflected off the second reflective surface 734 into the second lens interface 740, and focused by the second lens interface 740 into the plurality of receive channels 752. In this manner, the beam may entirely pass from the channels 715 of the transmit die 710 to corresponding channels 755 of the receiver photonics die 750 without incurring conventional loss associated with small waveguides.

In some implementations, the first reflective surface 732 and the second reflective surface 734 may be disposed on a common substrate 730. The substrate 730 may be separate from the transmit die 710 and/or the receiver photonics die 750. The reflective surfaces 732, 734 may be formed by a reflective coating on the substrate 730. As one example, the reflective coating may be a metal coating.

The reflective surface(s) 732, 734 can respectively be a flat surface (or planar surface). For instance, a portion of the reflective surface(s) 732, 734 upon which the transmit beam 762 or received beam 764, respectively, are incident may be substantially flat or planar. As one example, a plane may be generally fit to the reflective surface(s) 732, 734. As another example, the reflective surface(s) 732, 734 may have a depth, where the depth of the reflective surface(s) 732, 734 is negligible.

FIG. 8 depicts a side view of a portion of an example transceiver 800 for a LIDAR system according to some implementations of the present disclosure. The transceiver 800 includes various components similar to those discussed with reference to FIGS. 7A-7B, which are denoted with like reference numbers. Unless otherwise indicated, aspects discussed with reference to FIGS. 7A-7B are equally intended to apply to the embodiment depicted in FIG. 8.

The transceiver 800 includes a substrate 830 having a first reflective surface 832 and a second reflective surface 834. As discussed with reference to FIG. 7, the reflective surface(s) 834 may be, respectively, arranged to emit a transmit beam 762 into free space and receive a reflected beam 764 reflected off of objects in free space. A LIDAR system may infer information about these objects in free space based on characteristics of the reflected beam 764. The reflective surface(s) 832, 834 can respectively be a concave surface. For instance, the reflective surface(s) 832, 834 can respectively define a curvature across a surface of the substrate 830. The reflective surface(s) 832, 834 can have a center of curvature or focal point arranged such that the transmit beam 762 or the received beam 764, respectively, are reflected at a substantially orthogonal angle.

The following describes the technology of this disclosure within the context of a LIDAR system and an autonomous vehicle for example purposes only. As described herein, the technology described herein is not limited to an autonomous vehicle and can be implemented for or within other systems, autonomous platforms, and other computing systems.

What is claimed is:

1. A light detection and ranging (LIDAR) system for a vehicle, the LIDAR system comprising:
   a light source configured to output a transmit beam at a first orientation;
   a reflective surface configured to redirect the transmit beam from the first orientation to a second orientation;
   a receiver photonics die disposed above the reflective surface, wherein the receiver photonics die is substantially transparent to the transmit beam; and
   a lens interface configured to receive the transmit beam at the first orientation and focus the transmit beam onto the reflective surface;
   wherein the LIDAR system emits the transmit beam at the second orientation into an environment of the LIDAR system.

2. The LIDAR system of claim 1, wherein the reflective surface comprises a flat surface.

3. The LIDAR system of claim 1, wherein the reflective surface comprises a concave surface.

4. The LIDAR system of claim 1, further comprising an amplifier configured to receive the transmit beam from the light source and amplify the transmit beam.

5. The LIDAR system of claim 1, wherein the lens interface comprises a lens array, the lens array comprising a plurality of lenses respective to a plurality of channels.

6. The LIDAR system of claim 1, wherein the lens interface comprises at least a first lens configured to collimate the transmit beam to produce a collimated beam and a second lens configured to focus the collimated beam at a focal point on the reflective surface.

7. The LIDAR system of claim 1, wherein the LIDAR system further comprises a half-wave plate (HWP) configured to shift a polarization direction of the transmit beam.

8. The LIDAR system of claim 1, wherein the receiver photonics die is configured to receive a received beam from the environment of the LIDAR system.

9. The LIDAR system of claim 8, wherein the receiver photonics die is disposed such that the transmit beam passes through the receiver photonics die after being reflected by the reflective surface.

10. The LIDAR system of claim 9, wherein the receiver photonics die comprises a transmit portion through which the transmit beam passes and a receiving portion offset from the transmit portion, the receiving portion configured to receive the received beam from the environment of the LIDAR system and provide the received beam to at least one photonics component on the receiver photonics die.

11. The LIDAR system of claim 9, wherein the reflective surface is disposed on a substrate, and wherein the substrate and the receiver photonics die each comprise one or more alignment guides indicating an alignment between the substrate and the receiver photonics die.

12. The LIDAR system of claim 8, wherein the receiver photonics die is substantially coplanar with a transmit die, the transmit die configured to provide the transmit beam from the light source to the lens interface; and
   wherein the LIDAR system further comprises:
      a second reflective surface configured to receive the received beam at the second orientation and redirect the received beam from the second orientation to the first orientation; and
      a second lens interface configured to focus the received beam into the receiver photonics die.

13. The LIDAR system of claim 8, wherein the receiver photonics die comprises silicon.

14. The LIDAR system of claim 1, wherein the reflective surface comprises a metal coating.

15. A light detection and ranging (LIDAR) system for a vehicle, the LIDAR system comprising:
   a light source configured to output a transmit beam at a first orientation;

at least one splitter configured to split the transmit beam among a plurality of channels;

a transmit die comprising a plurality of semiconductor optical amplifiers (SOAs) configured to amplify the transmit beam among the plurality of channels;

a reflective surface configured to redirect the transmit beam from the first orientation to a second orientation;

a lens interface configured to receive the transmit beam at the first orientation and focus the transmit beam onto the reflective surface; and a receiver photonics die disposed above the reflective surface, wherein the receiver photonics die is substantially transparent to the transmit beam;

wherein the LIDAR system emits the transmit beam at the second orientation into an environment of the LIDAR system after passing through the receiver photonics die.

16. The LIDAR system of claim 15, wherein the receiver photonics die comprises a transmit portion through which the transmit beam passes and a receiving portion offset from the transmit portion, the receiving portion configured to receive a received beam from the environment of the LIDAR system and provide the received beam to at least one photonics component on the receiver photonics die.

17. The LIDAR system of claim 15, wherein the lens interface comprises at least a first lens configured to collimate the transmit beam to produce a collimated beam and a second lens configured to focus the collimated beam at a focal point on the reflective surface.

18. The LIDAR system of claim 15, wherein at least one of the plurality of the channels comprises a local oscillator (LO) channel, wherein the LO channel passes a LO signal to the receiver photonics die without being amplified by the plurality of SOAs.

19. A light detection and ranging (LIDAR) system for a vehicle, the LIDAR system comprising:

a light source configured to output a transmit beam at a first orientation;

at least one splitter configured to split the transmit beam among a plurality of channels;

a transmit die comprising a plurality of semiconductor optical amplifiers (SOAs) configured to amplify the transmit beam among the plurality of channels;

a first reflective surface configured to redirect the transmit beam from the first orientation to a second orientation, wherein the LIDAR system emits the transmit beam at the second orientation into an environment of the LIDAR system;

a first lens interface configured to receive the transmit beam at the first orientation and focus the transmit beam onto the first reflective surface;

a second reflective surface configured to reflect a received beam at the second orientation from the environment of the LIDAR system and redirect the received beam to the first orientation;

a receiver photonics die, wherein the receiver photonics die is substantially coplanar with the transmit die; and a second lens interface configured to focus the received beam from the second reflective surface into the receiver photonics die.

20. The LIDAR system of claim 19, wherein the first lens interface comprises at least a first lens configured to collimate the transmit beam to produce a collimated beam and a second lens configured to focus the collimated beam at a focal point on the first reflective surface.

\* \* \* \* \*